United States Patent [19]
Abel et al.

[11] Patent Number: 5,852,809
[45] Date of Patent: *Dec. 22, 1998

[54] SYSTEM AND METHOD FOR ROUTING DATA AND COMMUNICATIONS

[75] Inventors: William D. Abel; Thomas D. Cali, both of Boca Raton, Fla.

[73] Assignee: Memorylink, Inc., Boca Raton, Fla.

[*] Notice: The term of this patent shall not extend beyond the expiration date of Pat. No. 5,289,371.

[21] Appl. No.: 377,294

[22] Filed: Jan. 24, 1995

Related U.S. Application Data

[63] Continuation of Ser. No. 198,422, Feb. 18, 1994, abandoned, which is a continuation of Ser. No. 943,501, Sep. 11, 1992, Pat. No. 5,289,371.

[51] Int. Cl.⁶ .......................... G06F 17/60; G06F 153/00
[52] U.S. Cl. .................................. 705/26; 705/7; 705/8; 705/14; 235/375
[58] Field of Search ............................ 364/401 R, 407; 379/91, 93, 94, 111–113, 133–137, 140; 455/31.1, 39; 705/1, 26, 27, 21, 15, 7, 8, 9, 5, 14; 235/375, 383, 385

[56] References Cited

U.S. PATENT DOCUMENTS

| | | |
|---|---|---|
| 4,530,067 | 7/1985 | Dorr . |
| 4,567,359 | 1/1986 | Lockwood .............................. 235/381 |
| 4,734,858 | 3/1988 | Schlafly . |
| 4,757,267 | 7/1988 | Riskin . |
| 4,775,935 | 10/1988 | Yourick .................................. 364/401 |
| 4,797,818 | 1/1989 | Cotter . |
| 4,817,129 | 3/1989 | Riskin . |
| 4,885,685 | 12/1989 | Wolfberg et al. ........................ 364/401 |
| 4,961,224 | 10/1990 | Yung ........................................ 380/25 |
| 4,972,318 | 11/1990 | Brown et al. . |
| 5,003,472 | 3/1991 | Perrill et al. . |
| 5,023,904 | 6/1991 | Kaplan et al. . |
| 5,029,199 | 7/1991 | Jones et al. . |
| 5,038,283 | 8/1991 | Caveney . |
| 5,073,929 | 12/1991 | Katz . |
| 5,159,698 | 10/1992 | Harrington et al. . |
| 5,193,110 | 3/1993 | Jones et al. . |
| 5,212,804 | 5/1993 | Choate ................................... 455/33.1 |
| 5,227,874 | 7/1993 | Von Kohorn ............................. 348/2 |
| 5,289,371 | 2/1994 | Abel et al. .............................. 364/401 |
| 5,295,064 | 3/1994 | Malec et al. ........................... 364/401 |
| 5,315,504 | 5/1994 | Lemble .................................. 364/400 |

OTHER PUBLICATIONS

The case for ASCII terminals, *InformationWEEK*, Mar. 21, 1988, No. 161, pp. 18–19.

"The Complete Computer System for Domino's Pizza Stores" and updates, Ordermation, Computer Marketing Corporation, 14 pages, original undated, updates dated Mar. 24, 1984, Aug. 27, 1984 and Feb. 15, 1985.

"FloraFax and 800–Flowers Announce Agreement," PR Newswire, Jan. 17, 1990.

"James McCann & 800–Flowers," Chain Store Age Executive Edition, p. 35.

"FTD Makes Consumer Connection With ANI," Robin Gareiss, Communications Week, May 27, 1991, p. 40.

*Primary Examiner*—Joseph Thomas
*Attorney, Agent, or Firm*—Kirk D. Houser; Eckert Seamens Cherin & Mellott, LLC

[57] ABSTRACT

A system for routing data and communications to one of a plurality of remote sites to promote reciprocal interaction among the remote sites. The system includes a central processing unit and a storage device to store a first set of data identifying a plurality of remote sites and a second set of data identifying the frequency at which each of the remote sites communicates with the system. The system selects a particular remote site to receive a particular communication by analyzing the second set of data. The system also contemplates a method of routing data and communications including the steps of storing routing data for identifying a plurality of remote sites and the frequency at which each of the remote sites communicates with a central processor, receiving a communication at the central processor, analyzing the routing data to select a particular remote site, and forwarding the communication to the selected remote site.

22 Claims, 10 Drawing Sheets

ENTERING MEMBER NUMBER

ENTERING ZIP CODE

CALLING THE FLORIST

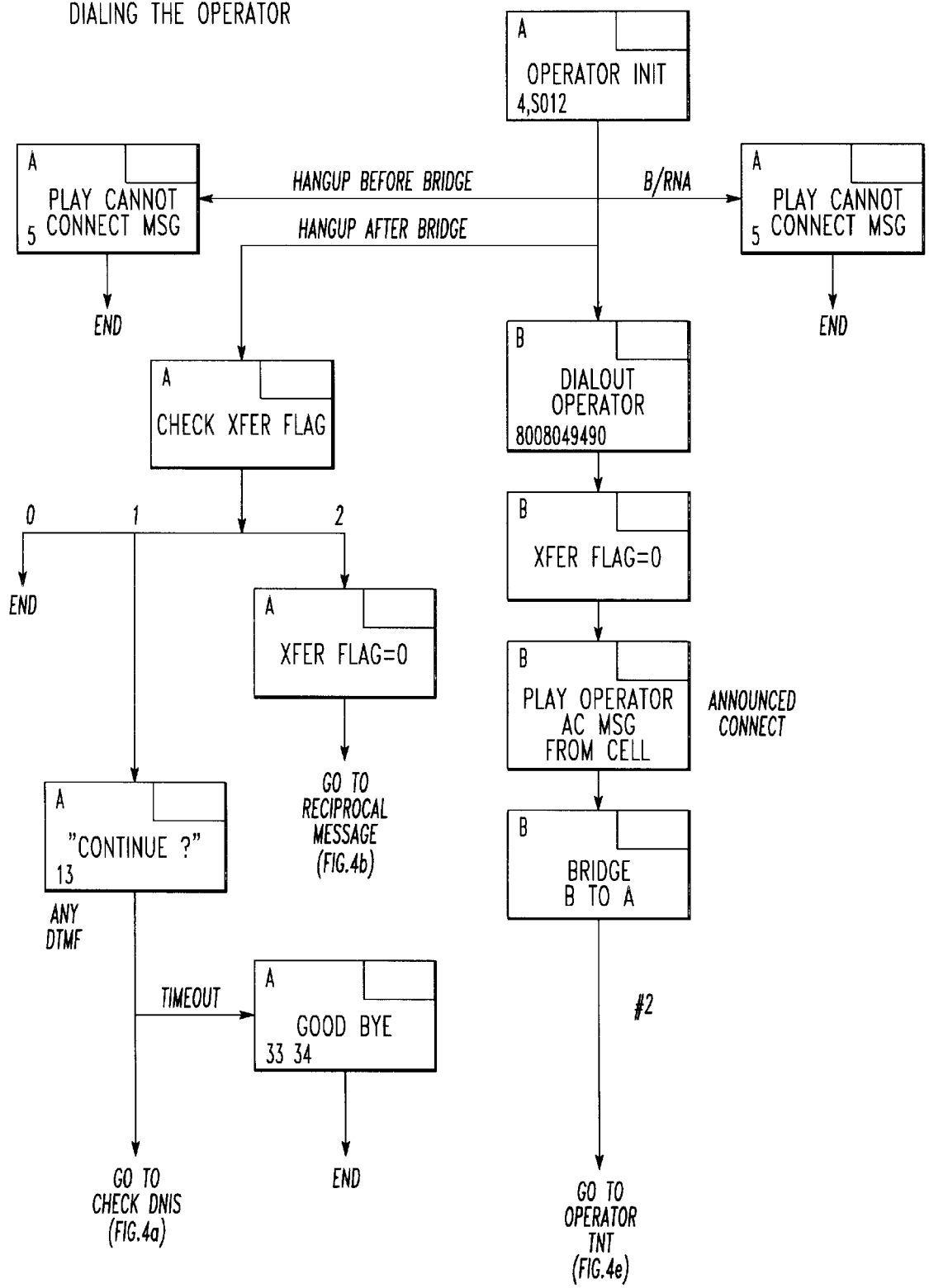

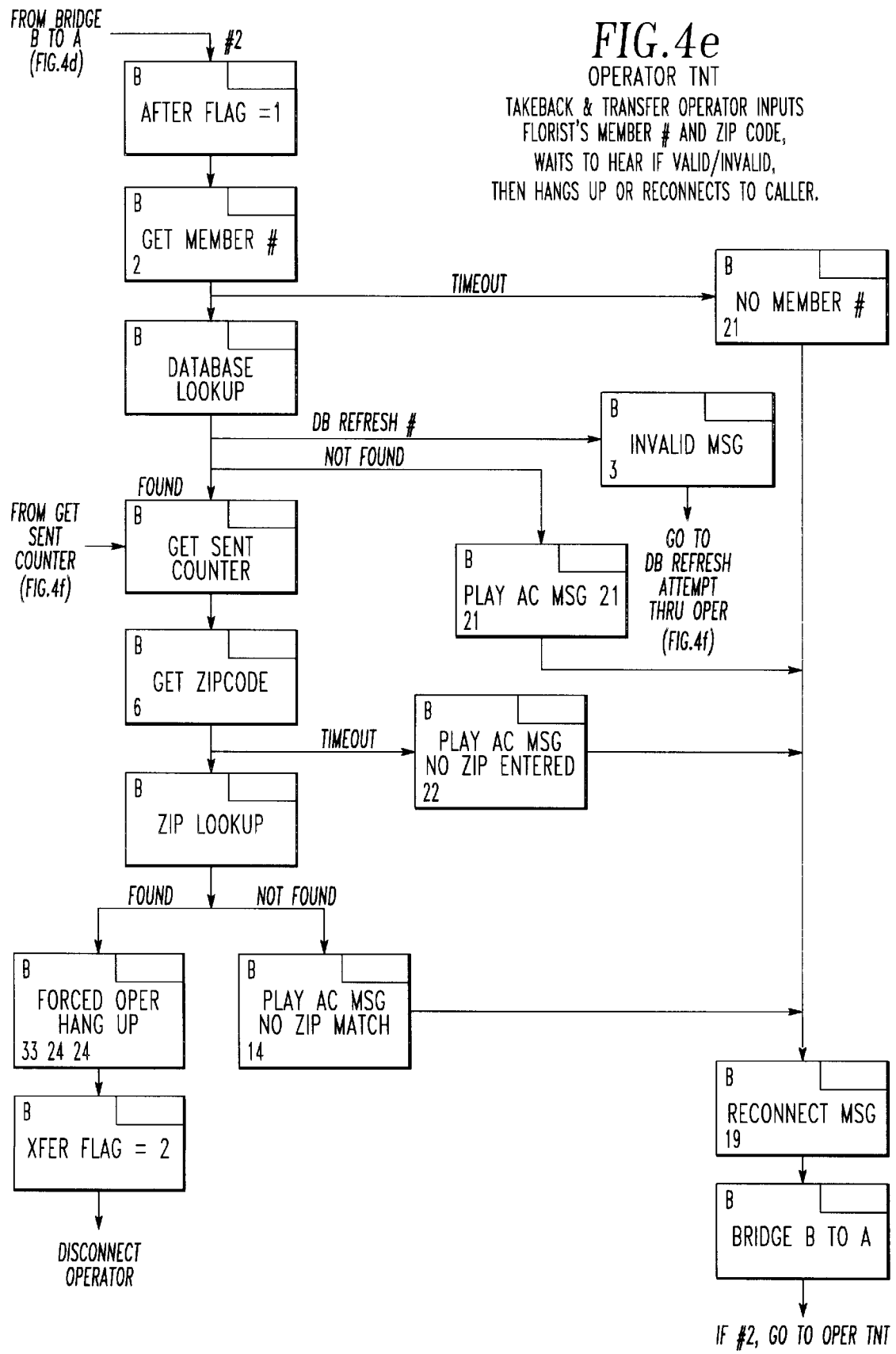

DB REFRESH ATTEMPT
THRU FLORCOM OPERATOR

ENTERING PASSWORDS

SYSTEM AND METHOD FOR ROUTING DATA AND COMMUNICATIONS

CROSS-REFERENCE TO RELATED APPLICATION

This application is a continuation, of application Ser. No. 08/198,442, filed Feb. 18, 1994, which is a continuing application of application Ser. No. 07/943,501, filed Sep. 11, 1992, and titled "System and Method for Routing Data and Communications," to be issued as U.S. Pat. No. 5,289,371. The contents of the copending application are hereby incorporated by reference.

FIELD OF THE INVENTION

The present invention relates generally to systems and methods for automatically routing and directing communications and data, and, in particular, to a system and method for routing communications from a central processing unit to one of a plurality of remote locations.

BACKGROUND OF THE INVENTION

As society becomes more and more spread out, the need for automated systems and methods for efficiently and equitably routing orders, data and communications from one location to one of a possible plurality of locations is ever-growing. Further, businesses that are widely spread out need an efficient method of generating referrals or reciprocal business orders. The florist industry provides a good example of such a need. There are many florist shops located across the country. Consumers often wish to send flowers, plants, or other gift items to people located in a different city. Presently there are several ways in which such an order can be completed.

One common way is simply for a customer to call or visit a nearby florist with an order to be delivered in a different locality. These orders are accomplished when the local florist (the "sending" florist) telephones the details of the order to a "delivering" florist (situated in the locale of the recipient of the order) who fills the order and delivers the flowers to the recipient. This process is time consuming because the local florist usually consults a large directory of florists provided by a wire service organization of which it is a member to obtain the telephone number and coding information of the delivering florist.

There are presently six such wire service organizations: Florist Transworld Delivery Service, Redbook, Carik, Teleflora, American Floral Society and Florafax. Each of these wire service organizations acts as a "clearing house" for transactions between its members. Transacting orders through these wire service organizations requires the delivering florist to take the time to fill out a report of "incoming wire orders" and send this to the appropriate wire service organization to obtain payment for the services rendered. This process is also costly because the various wire service organizations charge a significant commission for their services in acting as a clearing house among the various member florists.

Some florists may attempt to generate referral or "reciprocal" orders by placing costly advertisements in which acknowledgment is made of the willingness to reciprocate business to florists who favor their shop with deliverable orders in the various membership directories published by the wire service organizations. The process is further encumbered by the substantial lag between the time an order is processed and the time each delivering florist receives payment. This is due to the fact that the wire service organizations generally send monthly or bi-monthly statements and settle their bills at that time.

Some florists may subscribe to the Mercury Network, which is owned by the Florist Transworld Delivery Service ("FTD"). The members of the Mercury Network rent computer terminal equipment from FTD and use this equipment to send and receive orders and other communications. The main difference between the manner in which florists complete orders using the Mercury Network and the manner of completing orders described above is that orders are transferred by use of a distributed network of computer terminals instead of by telephone. The equipment is costly, takes up valuable floor space, is cumbersome to operate and does not allow direct personal contact between the sending florist and the delivering florist. This lack of personal contact makes special design, handling or delivery instructions difficult to accommodate.

Since there are more than 40,000 florists in the United States today, florists lack a practical and efficient means for reciprocating orders. Except for major cities, it is unlikely that a delivering florist will generate an order for the sending florist's delivery area within a few days after the referral. Also, because the average florist receives between 25 and 40 orders each week from florists outside his delivery area (in addition to their other local business), it is difficult for a small business such as a florist to record all orders which were received from sending florists. The vast majority of florists are very small businesses and they do not have the time nor the resources to maintain a cross reference of all business referrals. For these reasons, the average florist will simply consult a membership directory (from one of the major wire service organizations) to accomplish an outgoing order.

Alternatively, consumers may order flowers through "Flowers Direct", a company which provides a direct telephone connection between the consumer and the delivering florist by means of AT&T's "INFOWORX" service. Subscribers to the Flowers Direct service pay significant amounts of money each quarter in the hopes that the company's advertising and toll-free telephone service will generate new business referrals. With this type of service, the telephone call is relayed by AT&T to the florist in the zip code nearest the recipient.

There is also a service called "800 Flowers" provided by a company which advertises its toll free number and acts as a "sending only" member of FTD. In this situation, the company takes the order at its computer center and then relays it through the FTD system, keeping a large commission for its efforts. Most florists do not have the resources for the advertising that is required to take advantage of such a marketing approach.

Automated systems exist as well for selecting a location to receive particular data. For example, U.S. Pat. No. 4,797,818 discloses a computerized food order/delivery system by which a computer at a central location is programmed to receive customer orders and transmit particular order information to a predetermined particular store. This patent does not disclose, however, a system which directs orders based on a reciprocity principle. Rather, the store to receive a particular order is chosen simply based on the location of that store in relation to the consumer.

U.S. Pat. No. 4,734,858 discloses a method and system for enabling a large number of consumers to place orders for goods or services with a data terminal. The users of the system are provided with hand-held terminals on which they may enter a supplier and a particular item to be ordered. After such data is entered, the terminals may be connected to telephone lines over which the order information may be sent to a local processing center. The orders are then routed to the appropriate supplier. This patent does not disclose, however, a system which directs orders based upon reciprocity among those sending and receiving orders. Rather, orders are directed to the supplier, which the consumer chooses on his or her data terminal.

What is, therefore, lacking in the art is a system and method for enhancing and ensuring reciprocity in the sending of orders among florists, and also a more efficient method and system for routing data and communications and making payment settlements. Such a system and method would ensure that merchants who are located in or who serve a specific area receive reciprocal (incoming) orders in proportion to their sending activity and in relation to the sending activity of other florist members who are located in or who serve the same specific area.

SUMMARY OF THE INVENTION

It is therefore an object of the present invention to provide a system and method for routing data and communications received at a central location to one of a plurality of remote locations based on a comparison of the frequency at which each of the remote locations sends data and communications over the system.

It is also an object of the present invention to provide a system and method for keeping track of all communications sent through the system to ensure reciprocity in the sending of communications to subscribers of the system.

It is another object of the present invention to provide a system and method for expediting the payment and settlement of accounts among system users.

It is yet another object of the present invention to provide a system and method for routing orders which is inexpensive to operate and allows higher operating margins to subscribers.

In view of the above, a system for routing communications to one of a plurality of remote sites is provided comprising a central processing unit and a storage device to store a first set of data identifying the plurality of remote sites. Also stored is a second set of data indicating the frequency at which each of the plurality of remote sites communicates with the system. Means are provided for analyzing the second set of data to select a specific remote site to receive a particular communication.

According to a another aspect of the invention, a method is provided for routing communications. The method includes the step of storing routing data for identifying a plurality of remote sites and the frequency at which each of the remote sites communicates with a central processor. The method also includes the steps of receiving a communication at the central processor, analyzing the routing data to select a particular remote site to receive the communication, and forwarding the communication to the selected remote site.

The present invention advantageously provides a system and method for routing communications and data from a central processing unit to one of a plurality of remote locations to enhance and ensure reciprocity among users of the system. Thus, the invention is particularly well suited for industries in which businesses often receive referrals from like businesses in the same industry, but in different locales.

These and other features and advantages of the invention will be apparent upon consideration of the following detailed description of the presently preferred embodiments of the invention taken in conjunction with the appended drawings.

BRIEF DESCRIPTION OF THE DRAWINGS

FIGS. 4a to 4g are a flow chart outlining the steps performed by the preferred computer program to be executed on the system depicted in FIG. 3.

DETAILED DESCRIPTION OF THE PRESENTLY PREFERRED EMBODIMENTS

A. System Hardware

Figure 1:
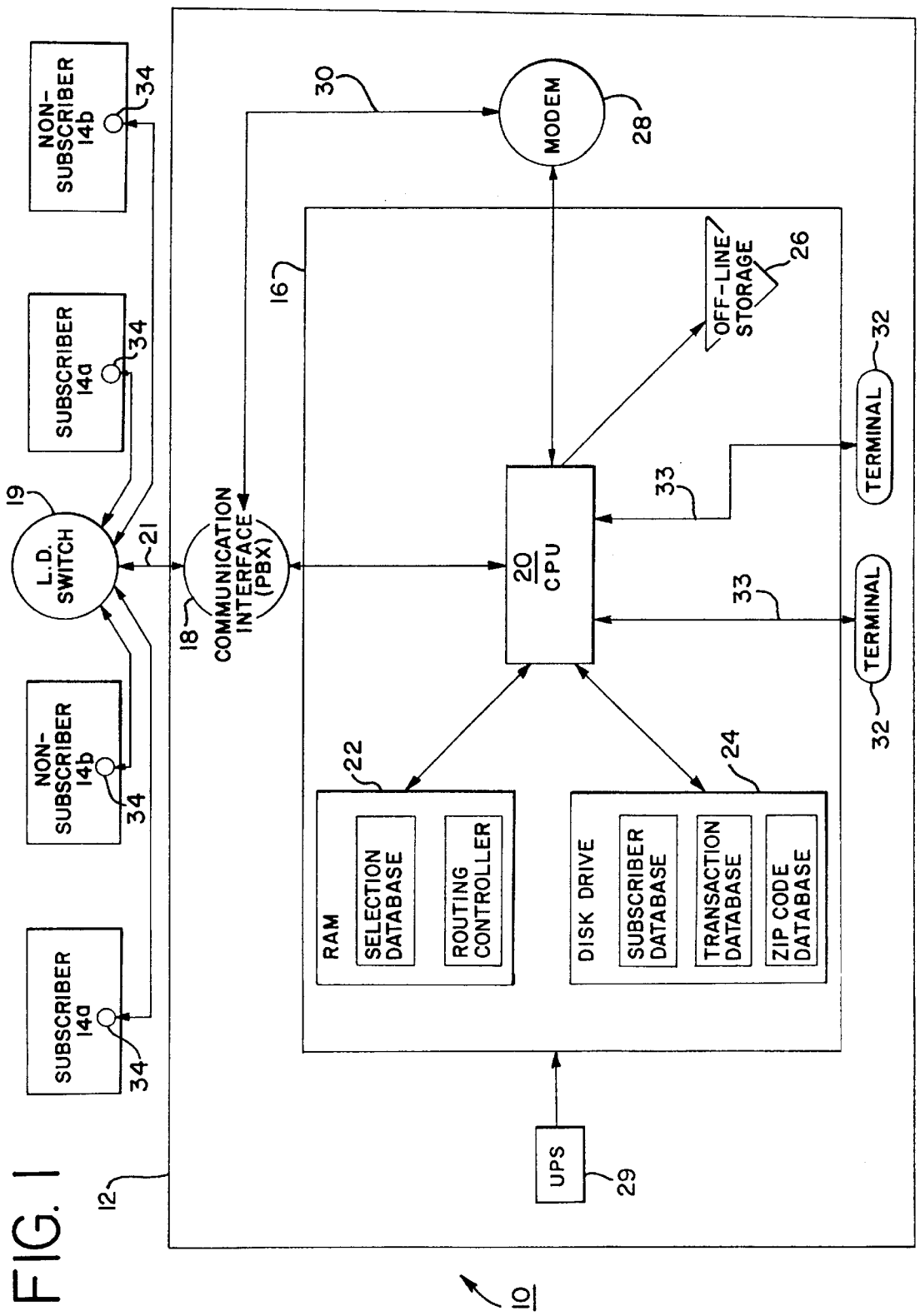
FIG. 1 is a block diagram of a data/communication routing system made according to a preferred embodiment of the present invention.

FIG. 1 is a block diagram representing a data/communication routing system 10 made in accordance with a presently preferred embodiment of the invention. In general, the data/communication routing system 10 operates to route data or communications to one of a plurality of possible locations. The data/communication routing system 10 shown in FIG. 1, preferably includes a central processing site 12, a plurality of first remote sites 14a, and a plurality of second remote sites 14b. In this preferred embodiment, the first remote sites 14a constitute floral shops who have subscribed to the data/communication routing system 10 and the second remote sites 14b constitute non-subscribers, such as individual consumers and non-subscribing merchants. Accordingly, the central processing site 12 operates to route data or communications received from either non-subscribers 14b or subscribers 14a to one of the plurality of subscribing floral shops 14a.

While this preferred embodiment of the present invention is utilized in the floral industry and uses a central processing site, the invention may be embodied in many different industries and in many different forms without departing from its spirit or essential scope. For example, in the travel industry, travel agents are spread out and serve different locales. This industry, like the floral industry, will benefit from the present invention which provides a system and method for ensuring and enhancing referrals or reciprocal business. Furthermore, instead of the central processing site 12, the present invention may be implemented using a distributed system in which the processing elements are located in remote sites and are interconnected through a distributed network.

The central processing site 12 preferably includes a computer system 16 and terminals 32 which are coupled to the computer system 16. The computer system 16 is coupled to a central communication interface 18, which permits the central processing site 12 to communicate with the remote sites 14a, 14b. The computer system 16 also preferably includes a central processing unit ("CPU") 20 for executing programs and controlling the operation of the computer system 16.

In this preferred embodiment of the invention, the computer system 16 comprises two computers manufactured by Digital Equipment Corporation: Model No. CL-44JT1-VB, Multiline DECvoice 24-line VAX 4000 Series Minicomputer Model 400; and Model No. CL-42HT1-VA, Multiline DECvoice 16-line VAX 4000 Series Minicomputer Model 200 Timeshare. The Model 400 computer is coupled to four Multiline DECvoice modules (model no. DTC05-SA) and the Model 200 is coupled to two such DECvoice modules. The DECvoice modules are configurable under software control to support digitized speech. The Model 200 and 400 computers preferably operate in parallel.

The communication interface 18 is preferably a digital Private Branch Exchange ("PBX"). In this preferred embodiment, the communication interface comprises a PBX model no. SX-2000, manufactured by Mitel Inc. of Florida. This PBX provides the network signalling capability to allow the transfer and conferencing of incoming telephone calls.

The terminals 32 are coupled to the CPU 20, preferably via a serial port, to allow terminal operators to transmit data to and receive data from the computer system 16. The terminals 32 also preferably include a screen (not shown). In this preferred embodiment, the terminals 32 are connected through a local area network 33, such as Ethernet or the like, and the system utilizes the PATHWORKS DOS software, provided by Digital Equipment Corporation, to establish and control the terminals 32. On the network 33, the terminals 32 are preferably served by a DECserver 700 (model no. DSRVW-CA) network server (not shown). Each of the terminals 32 also preferably comprise a DECstation 320sx base system (model no. DJ-PC443-03).

In this preferred embodiment, the computer system 16 further includes on-line memory 22, 24, and an off-line storage device 26. The on-line memory 22 preferably comprises Random Access Memory ("RAM") in the form of integrated circuits and the on-line memory 24 preferably constitutes a hard disk drive. In this preferred embodiment, the on-line memory 22, 24 is central to and shared by both the Model 200 and 400 computers. Also, the preferred embodiment utilizes "disk shadowing" in which the data stored in on-line memory 22, 24 is duplicated for back-up purposes. Such arrangements are well known in the art and further description is not required herein. The off-line storage device 26 is preferably a magnetic tape device. As those skilled in the art will appreciate, the computer system 16 of the present invention may utilize different memory devices than the ones disclosed herein without departing from the spirit and scope of the invention.

In this preferred embodiment, the computer system 16 is also coupled to an Uninterruptable Power Supply ("UPS") system 29. The preferred UPS system is the 10KVA UPS System, model no. 4N-AEAAL-BA, manufactured by Exide Corporation. This system prevents data which is stored in the on-line memory 22, 24 from being lost due to a power interruption. The UPS uses battery backups to power the computer system 16 down in phases in the event of a power failure. Such UPS systems are well known in the art and need not be discussed further herein.

The computer system 16 is also preferably coupled to a telephone modem 28, which is operable to communicate over a switched telephone line 30. In this preferred embodiment, the telephone modem 28 comprises the DECmodem V32, model no. DF296-DA, also manufactured by Digital Equipment Corporation. The telephone modem 28 preferably operates at 9600 BPS. The switched telephone line 30 also preferably can support a maximum transmission speed of 56 KB/second.

As those skilled in the art will appreciate, commercially available hardware other than that discussed above may be utilized without departing from the spirit and essential characteristics of the present invention. For example, rather than using the DEC Models 200 and 400 minicomputers which have a distributed CPU, the CPU 20 may be embodied in a microprocessor based system as is known in the art.

Each of the first and second remote sites 14a, 14b includes at least one local communication interface 34. These local communication interfaces 34 communicate with the central processing site 12, as described in detail below. In this preferred embodiment, the local communication interfaces 34 comprise telephones and/or facsimile machines, which are coupled with the central processing site 12 over the telephone lines preferably by dialing an "800" or toll-free telephone number. In this preferred embodiment, each of the remote sites 14a, 14b is capable of communicating with the central processing site 12 via a first toll-free number to send telephone orders and via a second toll-free number to send facsimile orders. As those skilled in the art will appreciate, the present invention is also not limited to the input and output devices described above. For example, computer terminals can be employed to provide input to and receive output from the system.

In this preferred embodiment, the central communication interface 18 is directly coupled to a telephone long distance provider. The long distance provider usually provides access to a digital switching system 19 capable of handling incoming toll-free telephone calls and outgoing Wide Area Telephone Service ("WATS"). The central communication interface 18 is coupled to such a long distance provider via a digital communications facility 21, such as a "T1" two-way carrier. This communications facility 21 is capable of transmitting digital voice and data signals, and of connecting directly to a PBX. Also, the central processing unit 20 is equipped to capture Automatic Number Identification ("A.N.I.") data of the calling party, which is output by the long distance provider, and to record this information in a storage medium. The A.N.I. data is encoded on incoming telephone calls and identifies the telephone number of the calling party.

Alternatively, the central communication interface 18 may be coupled to a telephone network through a central switch (not shown) located at the telephone company's nearest regional exchange office. In this alternative embodiment, the central communication interface 18 is coupled to the central switch via a digital link such as the "T1" two-way carrier mentioned above. The central switch is also preferably connected via a trunk line to a long distance provider for handling incoming toll-free telephone calls and outgoing WATS calls. Such arrangements are well known in the art and need not be further discussed herein.

B. System Data and Software

In this preferred embodiment of the present invention, four relational databases are stored in the computer system 16: (1) a "subscriber database", (2) a "selection database", (3) a "transaction database", and (4) a "zip code database".

1. Subscriber Database

The subscriber database is preferably stored in the on-line memory 24 and serves to provide information relating to each floral shop or other type of subscriber (first remote site 14a) that subscribes to the data/communication routing system 10. The subscriber database thus comprises a table of records for each subscriber, with each record preferably containing the fields shown in Table 1. The first thirty-three (33) fields of each record are preferably updated by manual entry from the terminals 32 and the last three fields are dynamically updated by a "look-up" function described below. The subscriber database is preferably indexed based on the "subscriber I.D." field.

TABLE 1

| Fields | Description |
|---|---|
| 1–15 | zip codes served |
| 16 | subscriber I.D. |
| 17 | membership effective date |
| 18 | subscriber name |
| 19 | subscriber address |
| 20 | subscriber primary telephone number |
| 21 | subscriber secondary telephone number |
| 22 | subscriber fax number |
| 23 | subscriber credit card number |
| 24 | subscriber credit card expiration date |
| 25 | contact name |
| 26 | type of business: proprietorship, partnership or corporation |
| 27 | proprietor's social security number |
| 28 | proprietor's date of birth |
| 29 | proprietor's residence address |
| 30 | year business started |
| 31 | number of retail locations |
| 32 | subscriber bank information |
| 33 | designation if "sending subscriber" only |
| 34 | total numbers of orders sent by subscriber |
| 35 | total number of orders received by subscriber |
| 36 | ratio of orders received to orders sent |

2. Selection Database

The selection (or "reciprocity") database is preferably stored in the on-line memory 22. This database comprises a table of records, with each record containing a subset derived from some of the fields which form the records of the subscriber database. These records preferably have the fields shown in Table 2. The first nineteen (19) fields are based on a "look-up" function of the related fields in the subscriber database and the last three fields are dynamically updated by the "routing controller program" described below. The selection database is preferably indexed based on the "subscriber I.D." field.

TABLE 2

| Fields | Description |
|---|---|
| 1–15 | zip codes served |
| 16 | subscriber I.D. |
| 17 | subscriber primary telephone number |
| 18 | subscriber secondary telephone number |
| 19 | subscriber fax number |
| 20 | total numbers of orders sent by subscriber (for all zip codes) |
| 21 | total number of orders received by subscriber (from all zip codes) |
| 22 | ratio of orders received to orders sent (all zip codes) |

The "look up" functions referred to above are implemented by database application software and operate as follows. When new subscribers are added to the subscriber database, or when old subscribers are removed, or when changes are made to the data of an existing subscriber, such changes are automatically written to the selection database. Furthermore, as mentioned above, the last three fields of the selection database are dynamically updated. Thus, the corresponding last three fields of the subscriber database are preferably updated periodically to coincide with the dynamically updated fields of the selection database. This periodic update of the subscriber database is also performed by the "look up" function.

3. Transaction Database

The transaction database is preferably stored in the on-line memory 24 and serves to track account billing and operational data. The transaction database is stored in a table of records, with each record preferably containing the fields shown in Table 3. The transaction database is preferably indexed based on the "receiving subscriber I.D." field.

TABLE 3

| Fields | Description |
|---|---|
| 1 | sending subscriber I.D. (or, if non-subscriber, telephone number of calling party obtained from A.N.I. feature) |
| 2 | receiving subscriber I.D. |
| 3 | sending subscriber credit card # |
| 4 | expiration date |
| 5 | receiving subscriber credit card # |
| 6 | expiration date |
| 7 | start time |
| 8 | completion time of call |
| 9 | length of call (in minutes to nearest tenth of minute) |
| 10 | # of orders sent by sending subscriber |
| 11 | # of orders received by sending subscriber |
| 12 | # of orders sent by receiving subscriber |
| 13 | # of orders received by receiving subscriber |

4. Zip Code Database

The zip code database is also preferably stored in the on-line memory 24. The zip code database references street addresses and cities to their appropriate zip codes. In the preferred embodiment, the zip code database is stored in "read only" form because there is no need to continuously change the data contained in the zip code database.

5. System Software

In this preferred embodiment of the present invention, computer programs are also stored in the on-line memory 22. These computer programs execute on the computer system 16, and in particular on CPU 20, to implement the various tasks necessary to route incoming data or communications to their proper location. The computer programs preferably include application software which operates to route communications and orders received from either subscribers 14a or non-subscribers 14b to either on-site operators who tend to terminals 32 or to one of the plurality of subscribing floral shops 14a. The computer programs also include operating system software for tracking the start times, completion times, and length of telephone calls on the system and for keeping counts of system usage, such as the number of telephone calls received by the hour and by the day.

The computer programs preferably include a "routing controller program" for processing and routing data, communications and/or orders, and for selecting which one of the plurality of first remote sites 4ais to receive a particular communication or order. In this preferred embodiment, the routing controller program utilizes voice application software and hardware which allows the computer system 16 to interact with callers by outputting voice messages and receiving digital input via touch-tone signalling. In this preferred embodiment, the routing controller program is implemented with the DECVoice software (model no. QA-VFUAA-H5), provided by Digital Equipment Corporation, together with suitable relational database application software.

The voice application software of this preferred embodiment is created using the DECVoice Builder For VMS software. In this preferred embodiment, the Model 400 computer utilizes the VAX/VMS TK50 (model no. QA-001AA-H5) operating system software and the Model 200 computer utilizes the VAX/VMS EXT MDDS TK50 (model no. QT-001AA-E5) operating system software. As those skilled in the art will appreciate, other suitable computer languages and software systems can be employed and will vary depending on the host computer system 16 selected.

According to this preferred embodiment of the invention, communications are routed so that the subscribers 4a who have the lowest relationship of number of orders received to number of orders sent receive priority for orders directed to their locality. Thus, the data/communication routing system ensures that subscribers 4a receive reciprocal orders for orders referred to merchants in different localities. A flow chart of the presently preferred steps to be implemented by the routing controller program is outlined in FIG. 2.

In this preferred embodiment, the data/communication routing system 10 may be accessed in any of four different ways. As indicated at program entry points 50 and 52 in FIG. 2, the system may be accessed by telephones or facsimile machines located at the subscribing members (first remote sites 4a) or at non-subscribing merchants (second remote sites 14b) using toll-free telephone numbers. As indicated at program entry points 54 and 56, the system may also be accessed by individual consumers (second remote sites 14b) through telephone or facsimile machines using toll-free telephone numbers different than the numbers used by subscribers or non-subscriber merchants.

Program entry point 50 indicates the starting point of the processing of telephone transmissions from the subscribing members (first remote sites 14a) or from non-subscribing merchants (second remote sites 14b). When the communication interface 18 receives a telephone transmission, the routing controller program operates to provide the caller with pre-recorded verbal messages which instruct the caller. (Such pre-recorded verbal messages are referred to in the art as "voice prompting" the caller.) The program first identifies the caller at step 58 by using the "A.N.I." feature provided by the long distance carrier. If the telephone number encoded on the incoming telephone call matches the telephone number of a record in the selection database, then the program proceeds to step 62. If a match for the retrieved telephone number is not found, the caller is voice prompted at step 60 to enter his or her subscriber identification account code using the touchtone capabilities of his or her phone. Thus, telephone calls from non-subscribing merchants will always be directed to step 60.

In this preferred embodiment, each subscriber is assigned a five digit account code at the time of subscription. These numbers are preferably assigned sequentially so that older members have lower account codes. The program checks the validity of the inputted subscriber identification account code by comparing it with the "subscriber I.D." fields of the records in the selection database. If no match is found, the entry is invalid. If the subscriber identification account code that was entered is invalid, or if the entry was not a touchtone multi-frequency signal, or if no entry is made within five seconds, the caller is directed to an operator at step 61. Non-subscribing merchants, however, will always be directed to operators as indicated at step 61. The operators will preferably attempt to convince such non-subscribers to subscribe to the system.

If the inputted subscriber identification account code entry is valid, the program proceeds to step 62. At step 62, the caller is voice prompted to enter the five digit zip code of the locale where the order is to be delivered. The program checks the validity of the inputted zip code by comparing it to the zip code fields in the records of the selection database. If no match is found, the inputted zip code is invalid. If the computer receives an invalid zip code or if no entry is made within five seconds, the caller is directed to an operator at step 61. If the zip code entry is valid, the program proceeds to step 64 where the program begins the process of selecting which subscriber (first remote site 14a) is to receive the present communication.

At step 64 the routing controller program searches the selection database and selects all records for subscribers that serve the zip code entered by the caller. This is accomplished by selecting those subscriber records of the selection database which contain a zip code that matches the zip code entered by the caller.

At step 66, the program sorts the selected records based on the "ratio of orders received to orders sent" field. These selected records are sorted in order from the lowest ratio to the highest ratio. In the case of a tie, the selected record with more orders sent is placed first. If two selected records show identical ratios and orders sent, the record with the lower subscriber identification account code (the older subscriber) is placed first. Alternatively, the program may use some other basis to deal with ties. After this record sort is completed, the first record from the sorted list is selected at step 68. This record represents the subscriber in the selected zip code with the lowest ratio of orders received to orders sent.

Figure 2:
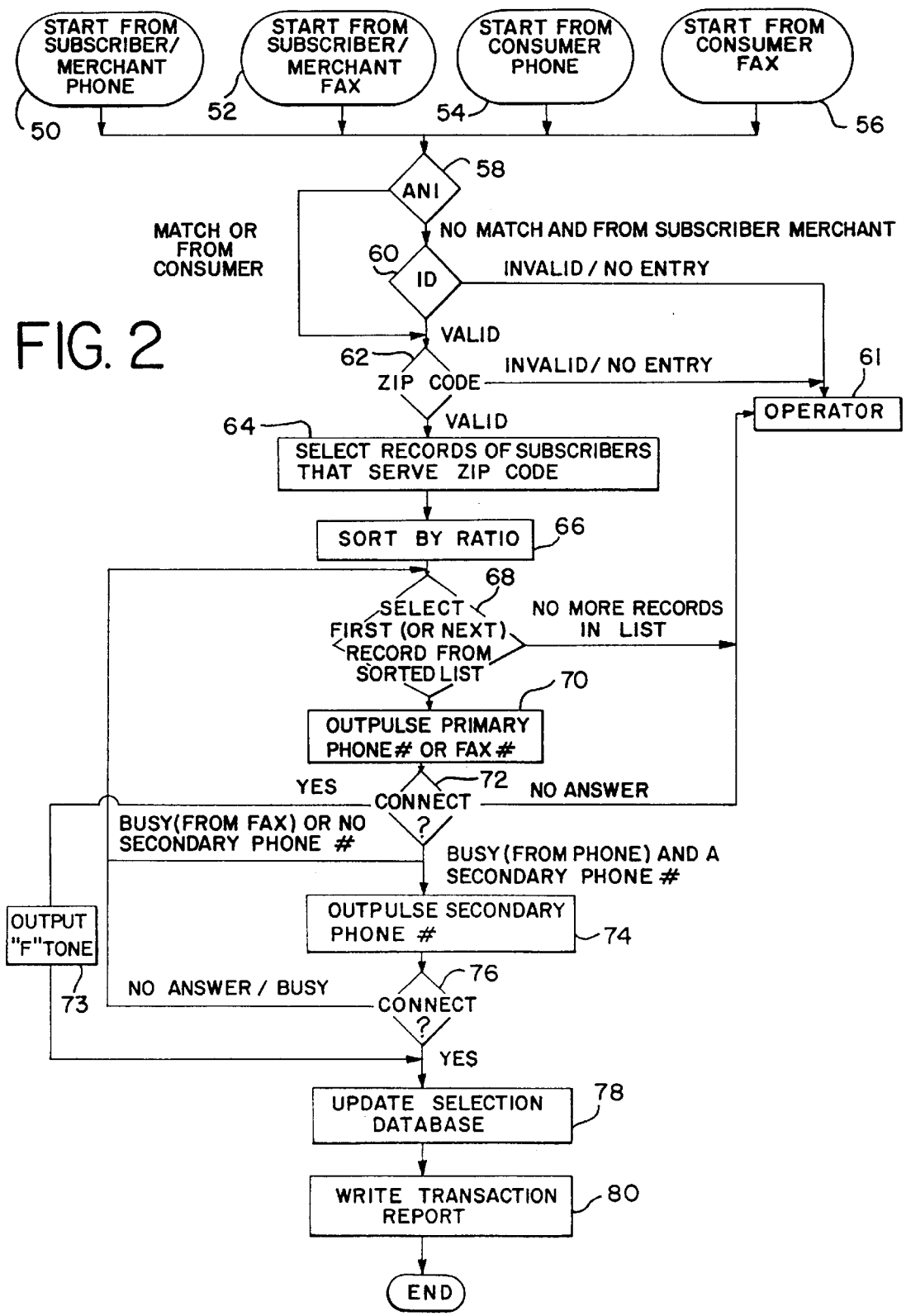
FIG. 2 is a flow chart outlining the steps performed by the preferred computer program to be executed on the system depicted in FIG. 1.

At step 70 of FIG. 2, the routing controller program causes the communication interface 18 to "outpulse" (i.e., dial the telephone number of) the "subscriber primary telephone number" stored within the record selected from the sorted list over a dedicated WATS line. As indicated at step 72, if no party answers within five rings, the caller is routed to an operator at step 61. If a connection is made, the computer system 16 disconnects from the call, the caller is placed in direct communication with the selected subscriber via a conferencing bridge on the PBX and the program proceeds to step 78.

As indicated at step 72, if a busy signal is detected, the "subscriber secondary telephone number" field of the record selected from the sorted list is accessed and the communication interface 18 outpulses the telephone number contained therein over a dedicated WATS line at step 74. (If no number is stored in the "subscriber secondary telephone number" field, the next record in the sorted list is selected at step 68 and the above process is repeated. However, if the end of the list has been reached, the caller is directed to an operator at step 61.) As shown at step 76, if a connection is made, the computer system 16 disconnects from the call, the caller is placed in direct communication with the selected subscriber via a conferencing bridge on the PBX and the program proceeds to step 78.

As shown at step 76, if a there is no answer after five rings, or if a busy signal is detected, the next record of the sorted list is selected at step 68 and the above process is repeated. As shown at step 68, if the end of the sorted list of records has been reached without achieving a telephone connection, the caller is directed to an operator at step 61.

At step 78, the selection database is updated for both the receiving subscriber and the sending subscriber to reflect the new order that was sent and received, and the resulting new ratios. However, the selection database is only updated for the receiving subscriber when the caller is a non-subscribing merchant.

Thus, in this preferred embodiment, the data/communication routing system 10 operates to route floral orders based on the ratio of the number of orders received by a subscriber to the number of orders sent by that subscriber. The following example illustrates how the routing controller program operates.

As noted above, the routing controller program, upon identifying a caller and receiving a zip code entry, searches the selection database for those subscribers who serve the inputted zip code. For the purposes of this example, the subscribers identified in Table 4 are retrieved via this search:

TABLE 4

| I.D. # | Orders Rec'd | Orders Sent | Ratio |
|--------|--------------|-------------|-------|
| 59664  | 2            | 4           | 50%   |
| 67345  | 3            | 5           | 60%   |
| 74322  | 3            | 7           | 43%   |
| 87449  | 5            | 10          | 50%   |

After the list in Table 4 is sorted by the routing controller program, subscriber #74322 will be the first to receive the next communication because it has the lowest ratio. The second choice is subscriber #87449, which is tied with subscriber #59664 for the second lowest ratio, but has a higher number of orders sent. Subscriber #59664 is third, followed by subscriber #67345.

After a telephone call is completed and the selection database has been updated, a record of the call details and billing information is written to the transaction database, as indicated at step 80. The data required to perform this step is obtained from the record of the sending and receiving subscribers as contained in the subscriber and selection databases, and from the operating software which records the start time, completion time, and length of the call. If the sender is a non-subscribing merchant, the telephone number of the calling party is entered in the "sending subscriber I.D." field and the "sending subscriber credit card #" field is left empty.

When a caller is routed to an operator at step 61, the caller is placed in communication with an operator who operates one of the terminals 32. When a call is transferred to an operator, the subscriber database record of the caller is preferably displayed on that operator's terminal 32. The record is located using either the telephone number which was retrieved by the A.N.I. feature or the subscriber identification account code entered by the caller.

The operators are preferably capable of accessing any of the databases stored in the computer system 16 using their terminals 32. After completing any necessary data entry, the operators have the capability of releasing the call back to the routing controller program for outbound completion of the call. Where outbound completions are attempted, but there is no answer after five rings (as indicated at steps 68 and 72), the operator may personally take the order information. The operator will then relay the order to the selected subscriber when that subscriber can be contacted. Alternatively, the operator may relay the order to a non-subscriber if necessary. In this preferred embodiment, the operators also have the capability to override the selection process and cause a call to be forwarded to a location other than the one selected by the routing controller program.

The present invention operates in substantially the same manner as described above when accessed by a facsimile machine (program entry point 52) located at a subscribing member 4a or a non-subscribing merchant 14b. However, a different toll-free telephone number is preferably provided for such facsimile communications. In this preferred embodiment, the facsimile user utilizes the touchtone capabilities of the facsimile machine to input the necessary database information.

After this data is properly entered, the system operates in the same manner as described above. The only difference, however, is that at step 70 the routing controller program causes the communication interface 18 to outpulse the telephone number stored in the "subscriber fax number" field of the selected record. In addition, there is no need for step 74. As shown at step 72, for facsimile transmissions, when a busy signal is encountered, the next record of the sorted list is accessed at step 68. After a connection is made, the routing controller program causes the central communication interface 18 to send an "F tone" to the sending facsimile machine at step 73. An "F tone" signals the facsimile machine to begin sending its transmission in a manner generally known in the art. The computer system 16 then disconnects from the call, allowing the facsimile transmission to be sent.

In an alternative embodiment, the routing controller program does not voice prompt the facsimile user, but receives the subscriber identification account code and zip code by digitally reading a form which is faxed from the user. In this embodiment, a pre-printed form, having spaces for the user to enter a subscriber identification account code and a zip code, is sent via facsimile to the central communication interface 18. In this embodiment, the computer system 16 is preferably equipped with software and hardware capable of interpreting the transmission to read both the subscriber identification account code and the zip code. Such software and hardware are well known in the art and need not be further described herein.

The information received via facsimile will be provided to the routing controller program, as indicated at steps 60 and 62. Once a connection is made, the routing controller program causes the central communication interface 18 to send an "F tone" to the sending facsimile machine as described above. The computer system 16 then disconnects from the call and allows the facsimile transmission to complete.

The present invention also operates in substantially the same manner when accessed by individual consumers 14b, by either telephone or facsimile machine. There are, however, several minor differences in the operation of the system. Separate toll-free telephone numbers are provided for consumer initiated telephone calls and facsimile transmissions. For consumer communications, after the telephone number of the calling party is captured by the A.N.I feature at step 58, there is no need to compare this number with the selection database. Rather, the program automatically proceeds to step 62. The program then operates in substantially the same manner as for subscriber initiated communications.

At step 62, the caller is voice prompted to enter the zip code of the locale where the order is to be sent. The process of selecting a subscriber to receive the communication and of routing the communication to that subscriber is the same as described above. After the communication is completed, the selection database is updated at step 78. As in the case of a non-subscriber communication, however, the only record that can be updated is that of the receiving subscriber. At step 80, where a record of the order is written to the transaction database, the telephone number of the calling party (obtained from the A.N.I. feature) is entered in the "sending subscriber I.D." field, and the "ending subscriber credit card #" field is left empty.

With the exception of the several differences described, facsimile communications from consumers 14b are handled in the same manner as described above for facsimile communications from subscribers 4a or non-subscriber merchants 14b.

Finally, when a non-subscriber is routed to an operator (step 61) the caller telephone number (obtained from the A.N.I. feature) is displayed on the operator's terminal 32. This is different from the subscriber record which is displayed for subscriber initiated communications.

Different manners of inputting data from telephones may also be utilized without departing from the spirit or scope of the invention. For example, the computer system 16 is preferably equipped with voice recognition capabilities, as known in the art, so that callers from rotary telephones will be able to verbally indicate the zip code of the delivery locale. In an alternative embodiment, the present invention uses such voice recognition capabilities to receive all necessary inputs from the caller.

The present invention is also not limited to the specific steps depicted in the preferred flow chart of FIG. 2, nor is it limited to the specific manner of achieving reciprocity described above. Rather, different steps may be implemented without departing from the spirit and essential characteristics of the present invention.

The subscriber database, the selection database, and the transaction database are periodically downloaded to the off-line storage device 26 to maintain a system backup. In this preferred embodiment, the off-line storage device 26 is a magnetic tape drive, and such a backup will occur at least once daily. Each backup is also preferably maintained on a storage medium for at least one year.

The invention also preferably includes application billing software stored in the computer system 16, which accesses the information stored in the transaction database. This billing software is employed to appropriately debit or credit the credit card accounts of the respective subscribers 4a who received and sent orders. This invoicing is achieved by using the modem 28 to send invoicing data to a credit card processing company, such as CYNET or NABANCO, over the switched telephone line 30. This invoicing data includes, among other requirements of the credit card processor, the relevant credit card information and the amounts of each debit or credit to the respective subscribers. In the preferred embodiment, such invoicing occurs daily.

The system of the present invention charges delivering subscribers a flat fee for each order that they receive. Sending subscribers are also credited with a flat fee, as a referral payment. Thus, the present invention eliminates the need for a clearing house wire service to settle florist debits and credits. Payments are made immediately through each subscriber's credit card accounts.

C. Alternate Preferred Embodiment

Figure 3:
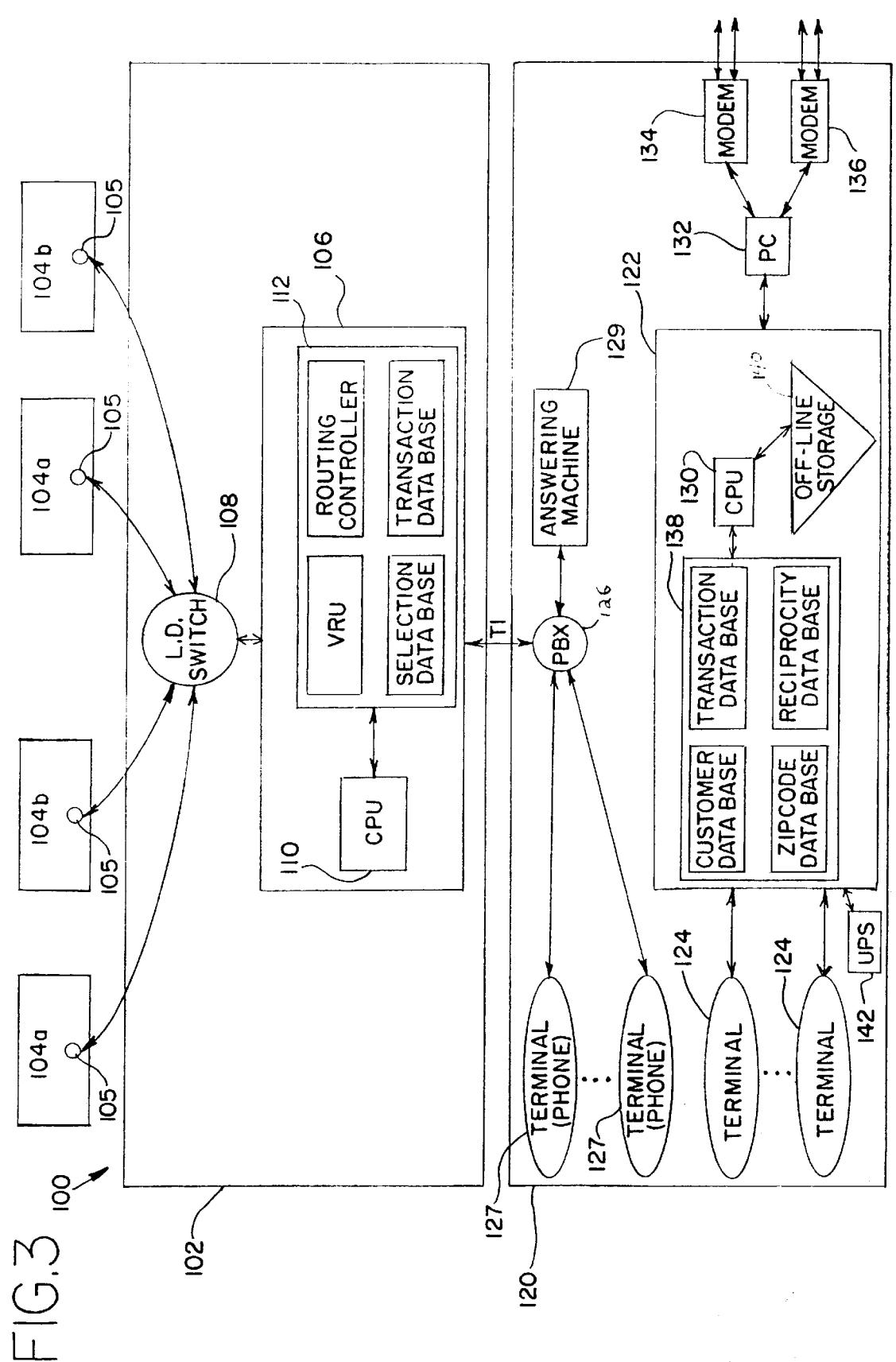
FIG. 3 is block diagram of a data/communication routing system made according to an alternate preferred embodiment of the present invention.

The embodiment presently used by the applicants utilizes the services of MCI to receive and route the data/communications. This embodiment is depicted in FIG. 3. The data/communication routing system 100 includes a long distance switching center site 102 (MCI's intelligent node platform located in Downer's Grove, Ill.), a premise based site 120 (Floral Communications, Inc., 1800 Corporate Blvd., Boca Raton, Fla. 33431), a plurality of first remote sites 104a and a plurality of second remote sites 104b. In this preferred embodiment, the first remote sites 104a constitute floral shops who have subscribed to the system and the second remote sites 104b constitute non-subscribers, such as individual consumers and nonsubscribing merchants. The long distance switching center site 102 operates to receive telephone calls from either non-subscribers 104b or subscribers 104a and route them to one of the plurality of subscribing floral shops 104a.

Each of the first and second remote sites 104a, 104b includes at least one local communication interface 105. These local communication interfaces 105 communicate with the long distance switching center site 102 as described below. The local communication interfaces in the presently used embodiment comprise telephones, which are coupled to the long distance switching center site by dialing an "800" or toll-free telephone number. One toll-free telephone number (1-800-FLORCOM) is established for the subscribing florists (first remote sites 104a) and another tollfree telephone number (1-800-747-0234) is established for the non-subscriber (second remote sites 104b). The applicants have also contracted with some non-subscribing organizations, such as Coca Cola and the AFL-CIO, and has established toll-free telephone numbers for their use. These organizations are paid a commission based on the number of orders sent using their assigned telephone number.

The long distance switching center site 102 includes MCI's computer system 106. The computer system 106 is coupled to a long distance digital switching system 108 capable of handling incoming toll free telephone calls and outgoing Wide Area Telephone Service ("WATS"). The switching system 108 permits the computer system 106 to receive telephone calls from the local communication interfaces 105 at the remote sites 104a, 104b and to route those calls to the local communication interfaces 105 located at the subscribing remote sites 104a. The computer system 106 also includes a central processing unit ("CPU") 110 for executing programs and controlling the operation of the computer system 106. In presently preferred embodiment, the computer system comprises MCI's Enhanced Call Routing ("ECR") platform that is located at MCI's network switch node in Downers Grove, Ill. This computer system 106 further includes on-line memory 112.

In this preferred embodiment, the premise based site 120 includes a computer system 122 and terminals 124 coupled to the computer system 122. These terminals are coupled to the computer system 122 by a serial port through a local area network (ETHERNET) and include a screen and keyboard. The presently preferred embodiment use eight such terminals. The computer system 122 includes a central processing unit 130 for executing programs and controlling the operation of the computer system 122. In the presently used embodiment of the invention, the computer system 122 comprises two processors manufactured by Digital Equipment Corporation called the 4000 Series Model 100. The computer system 122 preferably includes VAX Cluster software (made by Digital Equipment Corporation) that allows the memory devices to be arranged to provide redundancy and to provide specific tasks. Such arrangements are well known in the art. The system utilizes Pathworks software provided by Digital Equipment Corporation to establish and control the terminals 124. Each of the terminals are DEC station VT420 terminals (model no. DLVT420-AA).

The premise based site 120 includes a communication interface 126 which permits the premise based site to communicate with the computer system 106 at the long distance switching center 102. The communication interface 126 is a PBX (Private Branch Exchange). The PBX 126 is coupled to the long distance switching site by a digital private line 128, preferably a T1 line capable of 24 simultaneous voice connections. The PBX communication interface 126 presently used comprises a Model SX2000 Light System manufactured by Mitel, Inc. Terminals 127 are coupled to the PBX 126. In this embodiment, terminals 127 comprise eight telephones. An answering machine 129 is also coupled to the PBX 126.

The computer system 122 is also coupled to a personal computer ("PC") 132. In the presently preferred embodiment, PC 132 comprises a 425SX computer manufactured by Digital Equipment Corporation. The PC 132 is coupled to modems 134 and 136. Modem 134 allows to PC to communicate with the computer system 106 at the long distance switching center 102 and to MCI's EMAIL system. Modem 136 allows the PC to communicate with a third party credit card agent and with a bank to send Electronic Fund Transfers ("EFTs"). In this preferred embodiment, the third party credit card agent used is First Data Resources, located Omaha, Nebr. and the bank used to implement the EFTs is Comerica Bank. Modem 134 is preferably a Cardinal 9600 BPS modem (model no. V42) and modem 136 is preferably an 4800 BPS internal asynchronous modem manufactured by Barr Systems (model no. 30780).

The computer system 122 includes on-line memory 138 and an off-line storage device 140. The on-line memory 138 comprises a hard disk drive and the off-line storage device 140 is a magnetic tape device manufactured by Digital Equipment Corporation (model no. TK50 ) used for back up purposes. The computer system 122 is also coupled to an Uninterruptable Power Supply ("UPS") system 142. The UPS presently used is a 10KVA UPS System, model no. 4N-AEAAL-BA, manufactured by Exide Corporation. This system allows the computer system 122 be powered down in an orderly fashion in the event of a power interruption. Such UPS systems are generally known in the art.

In this embodiment, the routing controller program is stored in the on-line memory 112 of the computer system 106 located at MCI. This program executes in the computer system 106 to implement the various tasks necessary to route incoming telephone calls to subscribing florists and to record transactions. The program also allows a system administrator located at the premise based system 120 to retrieve transaction information and to update the databases. This program was written for the applicants by MCI's Enhance Voice Services division ("EVS") to work in conjunction with MCI's Voice Response Unit application (VRU). The VRU is also stored in the on-line memory 112 and functions to provide voice prompts and receive inputs from callers in response to these prompts. FIGS. 4a–g disclose a detailed flow chart outlining the steps performed by the routing controller program. This flow chart was submitted by the applicants along with the script contained at pages A1-A7 of the Appendix to MCI's EVS division located at 220 Jackson Street, Suite 300, San Francisco, Calif. 94111 ((415) 477-9150). MCI's EVS division implemented the routing controller program that runs in conjunction with applicant's system based on this information.

In this embodiment, the selection database is stored in the on-line memory 112 of the computer system 106. The selection database contains the following information for each subscriber 104a to the system 100: identification number, zipcodes served, a primary telephone number, a secondary telephone number, the total numbers of orders sent, the total number of orders received and the ratio of the orders received to the orders sent. The total numbers of orders sent and received and the ratio are dynamically updated by the routing controller program. A transaction database is also stored in the on-line memory 112 of the computer system 106. This database serves to track each call that was received by the system and each call that was routed by the system. The records in this database are called Custom Call Records ("CCRs") and record for each call received by the system, inter alia, the length of the call, the subscriber identification number (if any) entered by the caller, the zipcode requested, the telephone number outdialed, whether the call was completed and if not, the disposition of the call (i.e., busy or abandoned) and the telephone number through which the system was accessed. Pages A8–A11 of the Appendix contain the specification describing the layout of the CCRs.

A customer database, a transaction database, a zipcode database and a reciprocity database are stored in the on-line memory 138 of the premise based computer system 122. Each of these databases was created using DB4 software (sold by Aston-Tate). The databases can be accessed and modified using terminals 124 and PC 132. The customer database contains the following information for each subscriber: the subscriber's member identification number, membership date, name, contact, address, primary and secondary telephone numbers, facsimile number, credit card number and type, credit card expiration date, type of business, name of owner, the owner's date of birth, the owner's social security number, the owner's address, the bank routing number for the subscriber's bank, a code indicating the type of account kept by subscriber, the subscriber's checking account number, date of establishment of subscriber, an indication of whether the subscriber is a full subscriber, a code indicating whether the subscriber is a sending only subscriber, an indication of whether the customer is a sending only customer, the date on which this information was entered into the database, and the operator who entered the information.

The transaction databased stored in the on-line memory 138 records information regarding each transaction—the date of the call, which subscriber received the call and which, if any, sent the call. The zipcode database stores for each zipcode, the subscribing florists that serve the zipcode. The reciprocity database stores for each subscriber, the total number of orders sent, the total number of orders received and the ratio of the total number of orders sent to received. This database is not current, but is updated periodically as described below.

Figure 4A:
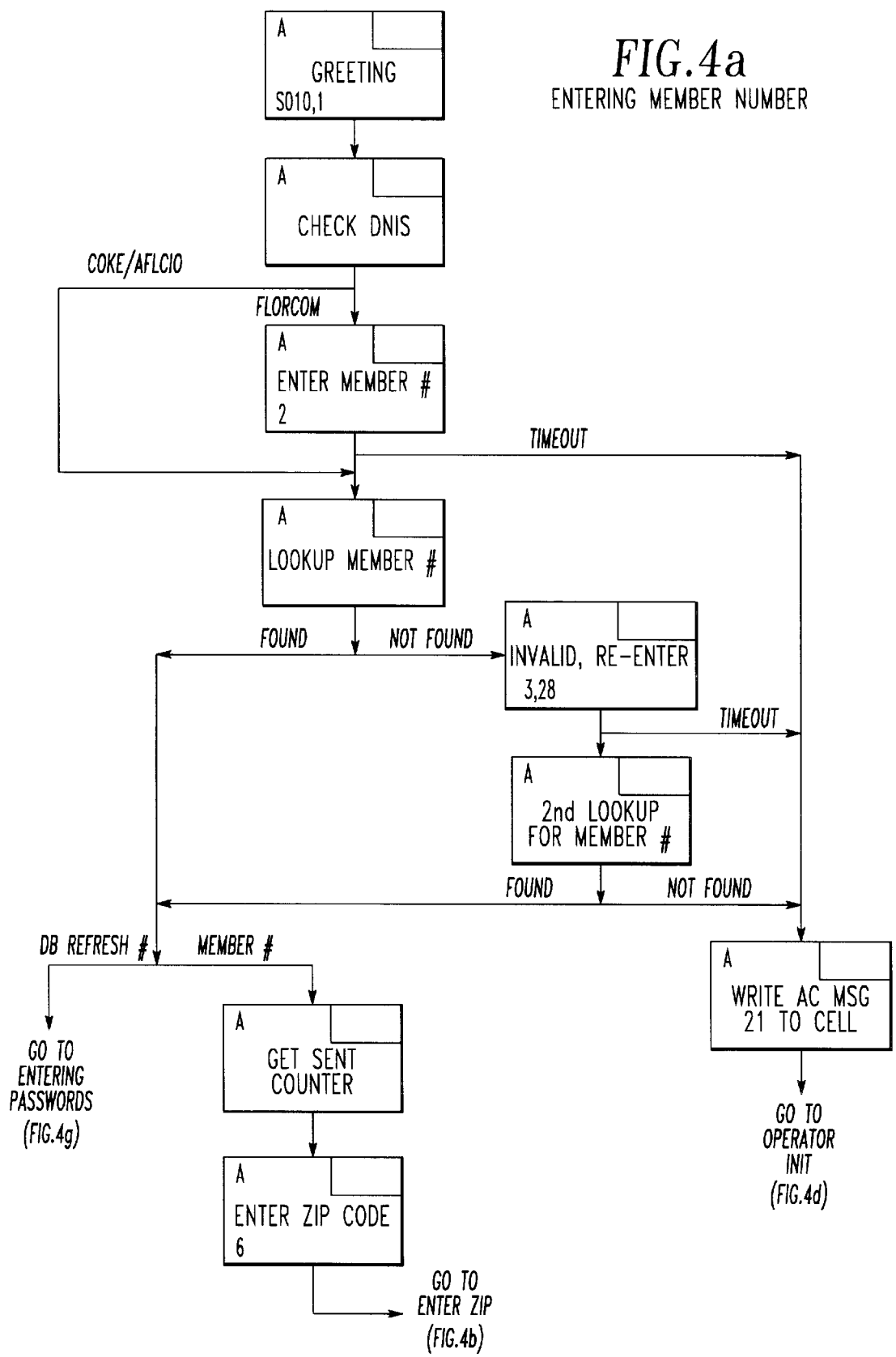
Figure 4B:
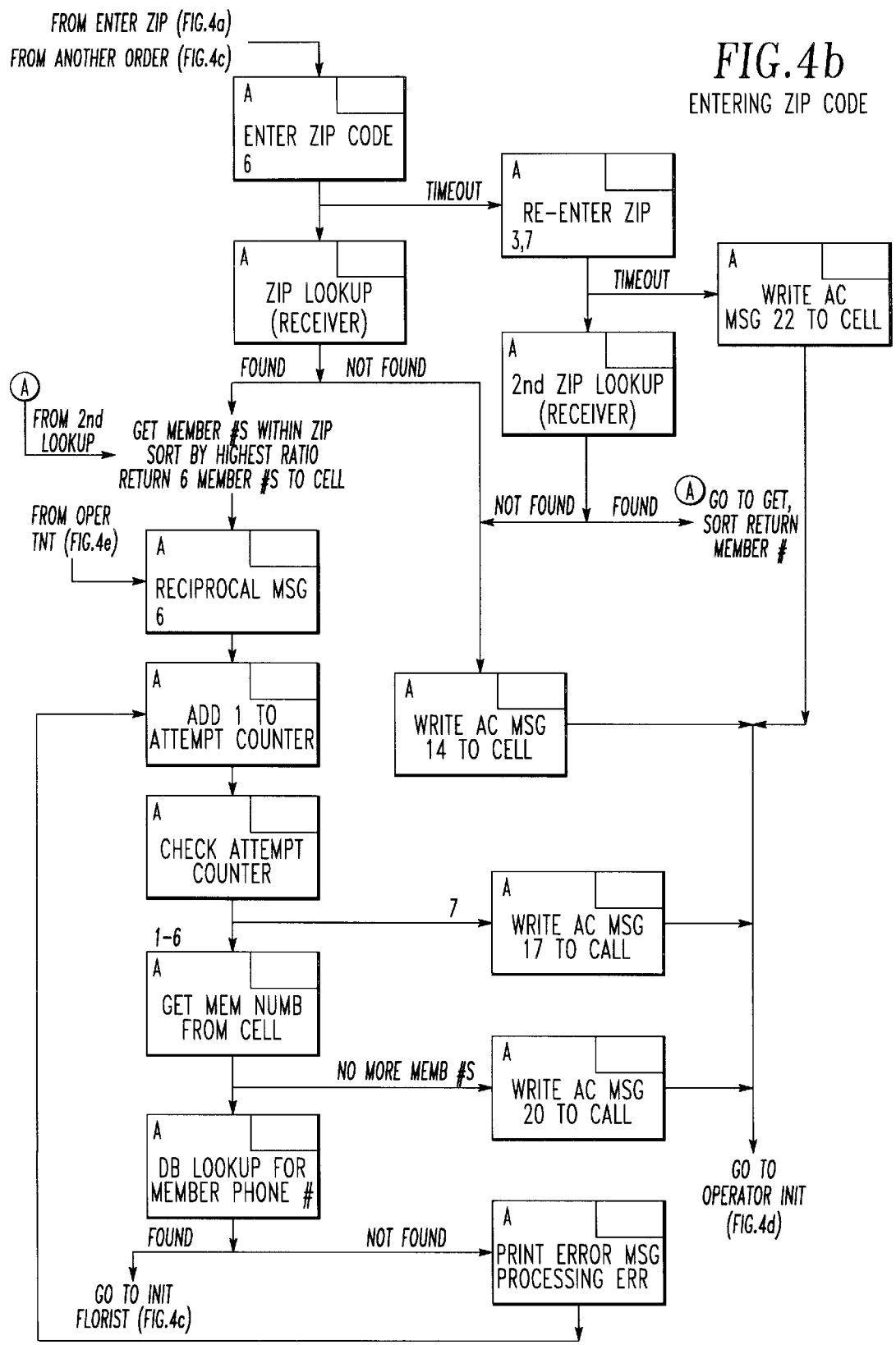

The routing controller program operates in conjunction with MCI's VRU application to receive telephone calls and route those calls to subscribing florists 104a. As described above, the system 100 can be accessed through different toll-free telephone numbers. As shown FIG. 4a and the Appendix, the routing controller operates with the VRU to provide each caller with an initial voice greeting. The routing controller program is capable of recognizing which number was dialed by the caller by using MCI's Dial Number Identification System ("DNIS"). If the telephone number dialed is the one established for subscribing florists, the routing controller program operates with the VRU to voice request that the caller enter his/her member identification number. If the telephone number dialed is one of the numbers established for non-subscribers, this step is skipped. Next, the routing controller program (in conjunction with the VRU) requests that the caller enter the zipcode of the area to which he/she wishes to send flowers. If a valid zipcode is entered, the routing controller program accesses the selection database to retrieve from the subscribing florists 104a that serve the requested zipcode, six telephone numbers of the subscribing florists 104a that have the highest ratio of total number of orders sent to total number of orders received. (FIG. 4b). In the event of a tie, the florist that has been a subscriber longer (the one that has a lower subscriber member identification number) is given priority. If the subscribing florist 104a with the highest ratio that serves the requested zipcode has two telephone numbers, then the first two telephone numbers retrieved will be that subscribing florist's telephone numbers. The routing controller program then attempts to outdial the telephone number of the florist having the highest ratio. If this florist cannot be reached, the routing controller program causes the computer system 106 to attempt to outdial the next telephone number that was retrieved. This procedure continues until either a connection is made or all telephone numbers retrieve have been attempted.

Figure 4C:
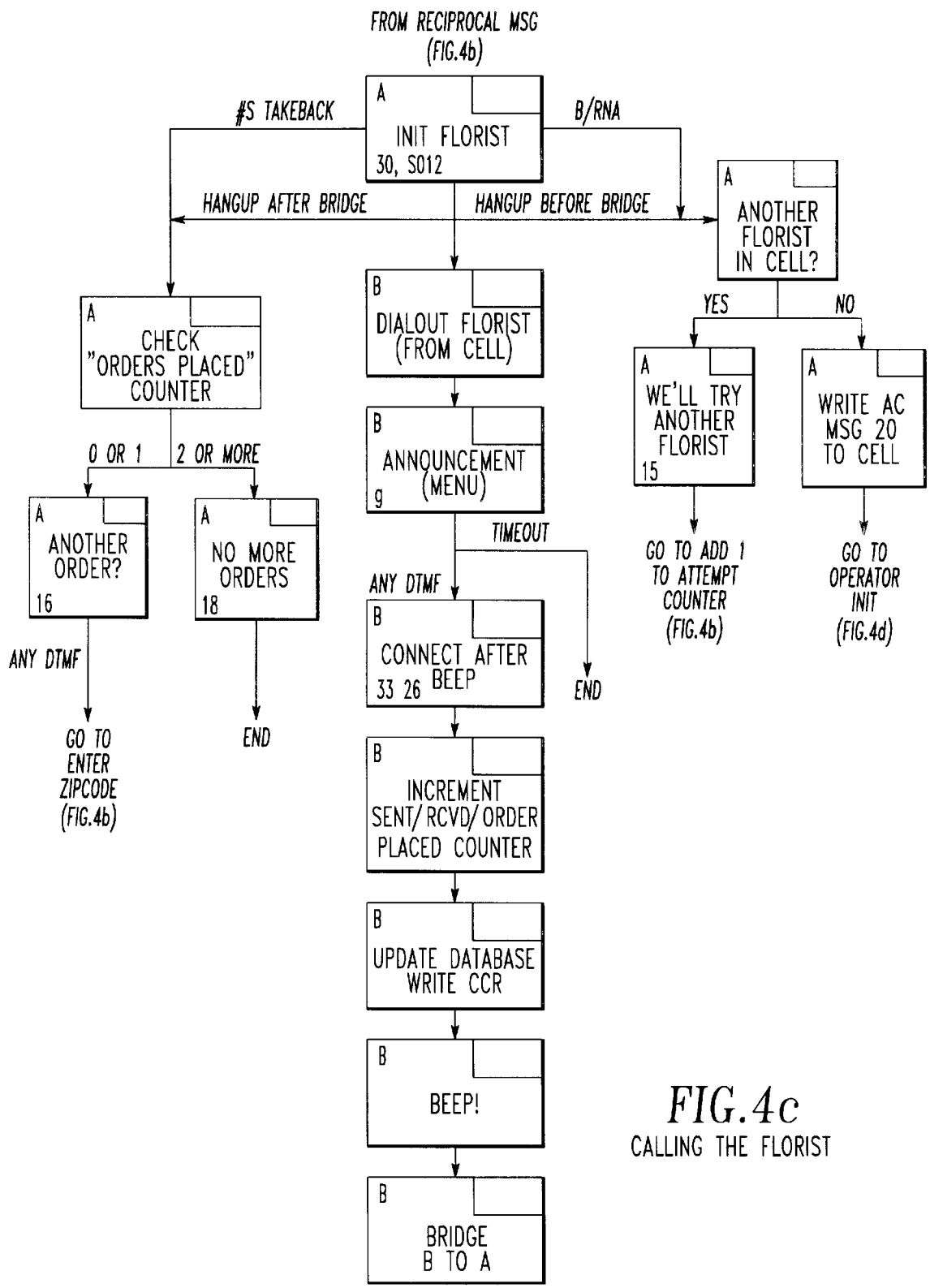

Once a connection is made, the routing controller program (in conjunction with the VRU) provides a voice greeting to the recipient of the call. (FIG. 4c). If the recipient presses any key on his/her telephone, the routing controller program causes the computer system 106 to bridge the caller with the recipient. At this point, the routing controller program updates the selection database accordingly. The subscribing florist 104a that received the call has its total number of orders received counter incremented by one and, if the sender was also a subscribing florist 104a, its total number of orders sent counter is incremented by one. After the database is updated, the routing controller program writes a CCR report to the transaction database.

In the event that an invalid member identification number was entered, an invalid zipcode was entered or if no entries were made after five seconds, the routing controller program causes the computer system 106 to direct the telephone call to the on-premise PBX communication interface 126. (FIG. 4d). The PBX 126 then automatically distributes the call to the terminal 127 that has been idle the longest. Operators are stationed to receive such telephone calls at the terminals 127. Once a call is routed to an operator, the routing controller program (in conjunction with the VRU) prompts the operator with a voice message indicating the reason that the call has been transferred (i.e., invalid zipcode entry or no entry). In the event that all terminals 127 are in use, the telephone call is directed to an answering machine 129 where the caller can leave a message. Once an operator is free, that operator will return the message. The operators have access to the terminals 124, through which they can access information stored in the databases stored in the on-line memory 138. Once the caller's problem has been solved, the operator can direct the telephone call back to the computer system 106 via the PBX 126 and enter in the proper member identification number and/or zipcode so that the call can be properly completed. (FIG. 4e).

A system administrator located at the premise-based site 120 can access the information stored transaction database stored in on-line memory 112 by using the PC 132 in conjunction with the modem 134. In the presently used embodiment, the administrator uses a communication software package called Kermit version 3.1.066 (a public domain product supported by Columbia University, N.Y., N.Y.) to communicate with MCI's EMAIL system. Each day, MCI dumps the contents of the transaction database into its EMAIL system. Typically, the administrator will access this data once a day and retrieve all of the CCRS created for that day. These CCRs are downloaded, using the Kermit software, to the PC 132. The system administrator uses the CCRs to generate the data that must be sent electronically to the credit card processing agent and to the a bank for EFTs. For each call received, the credit card of that subscribing florist 104a is debited a receiving fee. For each call that was sent by a subscribing florist 104a, the checking account of the sending florist is credited a sending commission. Each day, the system administrator uses PC 136 to update the transaction and reciprocity databases stored in on-line memory 138 of the premise based computer system 122.

In the event that no order was placed by the caller to the receiving florist after the call was connected, the receiving florist can contact the system administrator using a toll-free telephone number. If this occurs, the system administrator will see that the subscriber is not charged a receiving fee for that call.

Figure 4F:
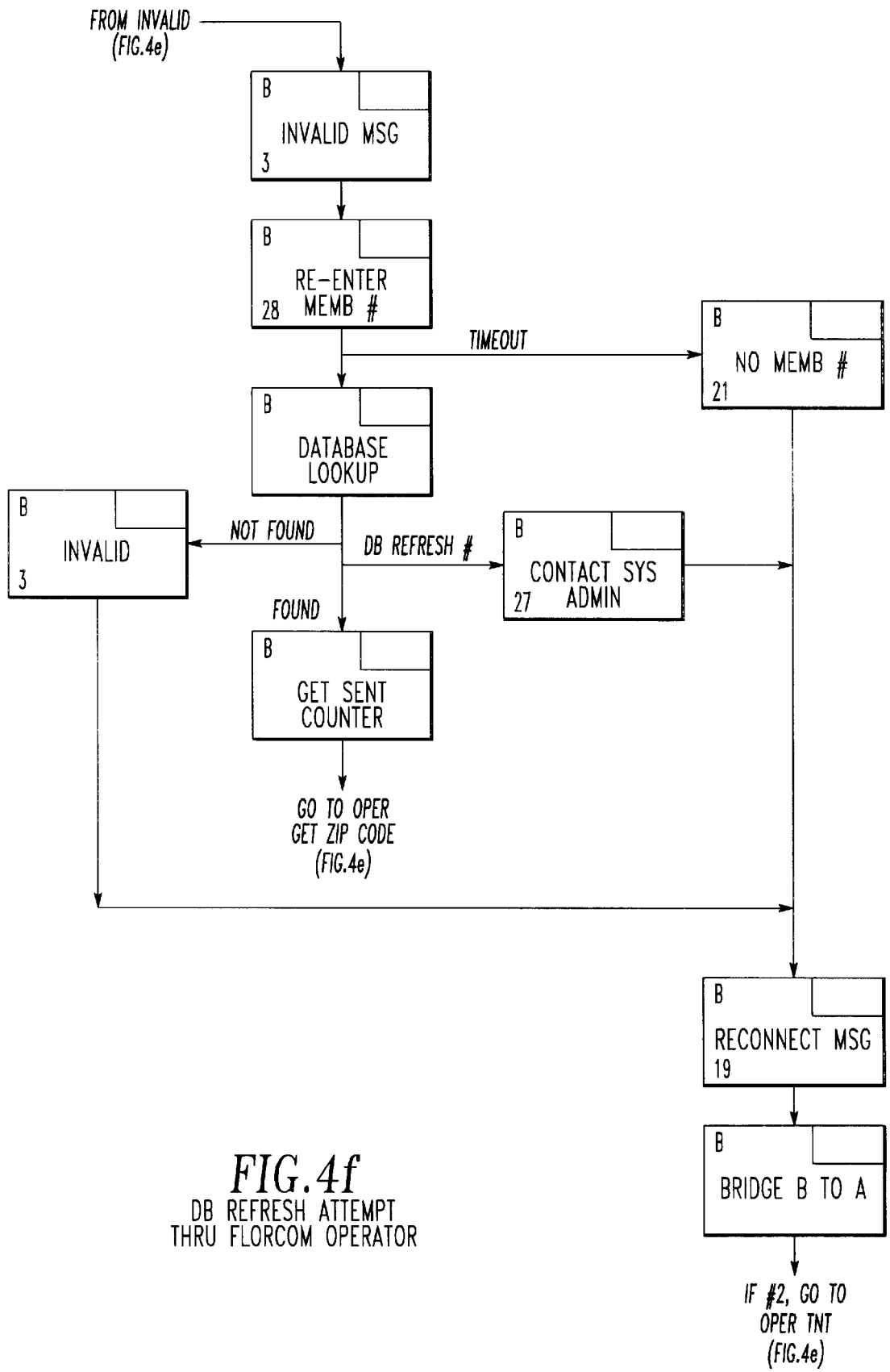
Figure 4G:
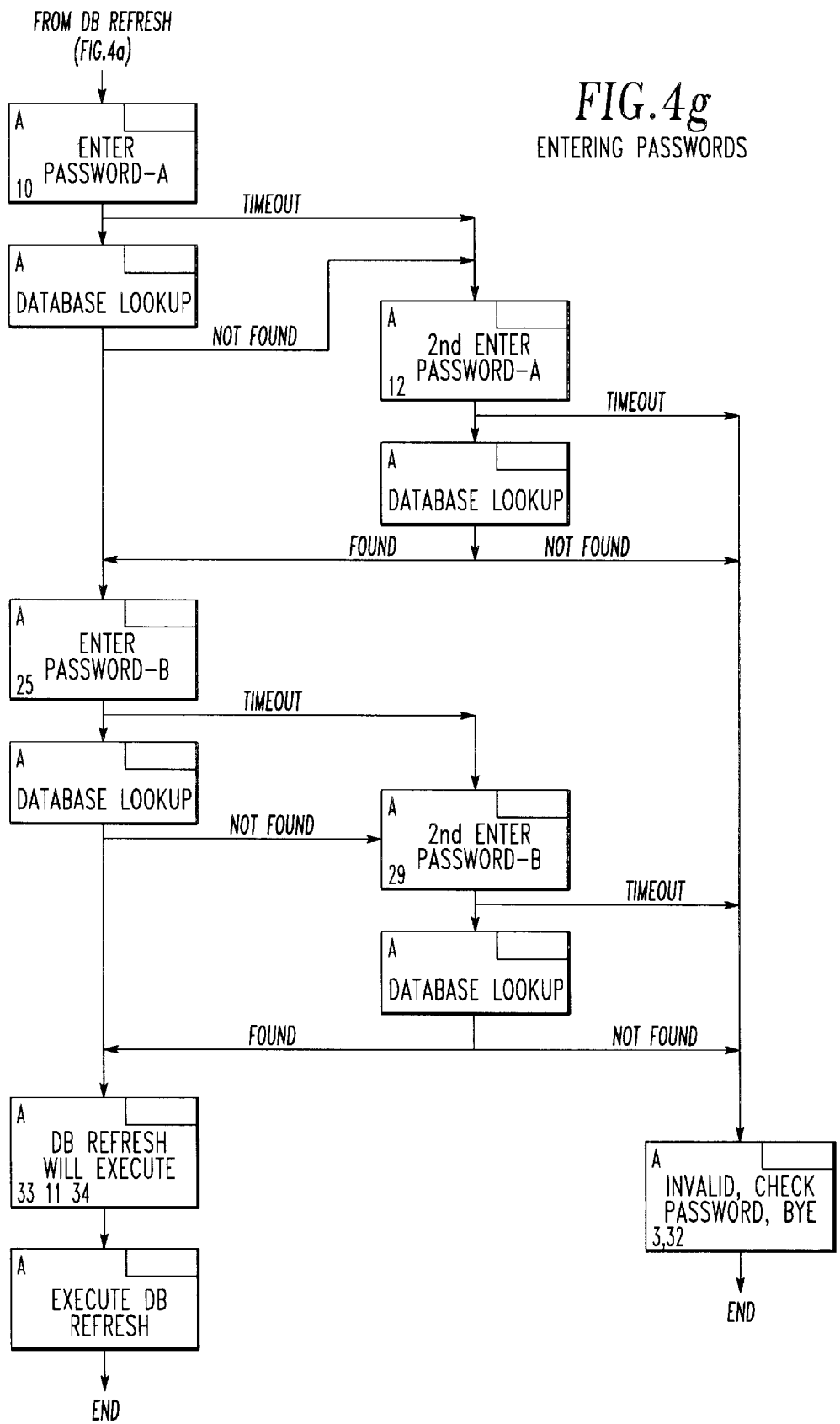

The system administrator and the operators may also use the PC 132 with the Kermit software to view the contents of the selection database and to reset or change the counters. (FIGS. 4f–g). The selection database is periodically updated to add new subscribers or to keep telephone numbers up to date by MCI. MCI gets the necessary data to perform this update from two data files sent via modem 134 by the system administrator to MCI's EMAIL system. These two data files comprise a "zipfile" which relates zipcodes to subscriber member identification numbers and a "phone file" which, for each subscriber identification number, contains a primary and secondary telephone number.

The system administrator also periodically uses the PC 132 to access MCI's EMAIL and download certain reports generated by MCI based on the contents of the transaction database stored in on-line memory 112. These reports include summaries of the hourly call activity for each of the incoming toll-free telephone numbers and summaries of the outdialed calls that were received on the toll-free telephone numbers established for non-subscribing organizations that have contracted with the applicants. These reports allow the system administrator to properly pay commissions to the organizations that have contracted with the applicants.

The present invention encourages and enhances reciprocity in the sending of orders among businesses. The invention provides incentives for subscribing merchants to send or refer orders to other subscribing merchants and rewards those subscribing merchants who have the highest sending activity in relation to the sending activity of other subscribing merchants who serve the same locale. The present invention is advantageous in that most businesses do not have the time nor the resources to ensure reciprocity with like businesses from which they have received orders.

In the floral industry, the present invention also eliminates the need for maintaining cumbersome paperwork in filling out reports of orders delivered and in maintaining records of such orders. Florists using the present invention also receive payments faster and more efficiently. The present invention further eliminates the need for costly and space consuming computer equipment located on the florists' premises, as required by the FTD Mercury Network. The need for florists to advertise in wire service membership directories and the high costs associated therewith are also eliminated.

The invention may be embodied in other forms than those specifically disclosed herein without departing from its spirit or essential characteristics. The described embodiments are to be considered in all respects as illustrative and not restrictive and the scope of the invention is commensurate with the appended claims rather than the foregoing description.

We claim:

1. A system for routing communications to one of a plurality of remote sites comprising:

a central processing unit;

a storage device operatively associated with the central processing unit to store routing data identifying a plurality of remote sites and associated with the number of times that each of the remote sites has sent a communication to other remote sites for a prior period and further associated with the number of times that each of the remote sites has received a communication from other remote sites for the prior period;

a selector operatively associated with the central processing unit to select a specific remote site to receive a particular communication based on the routing data; and a communication interface operatively associated with the central processing unit for forwarding the particular communication to the specific remote sites, said central processing unit including means for automatically updating, without requiring human intervention, a ratio for at least one of the remote sites from (a) the number of times that a particular remote site has sent a communication to other remote sites and (b) the number of times that the particular remote site has received a communication from other remote sites, and said selector employing the ratios for the remote sites to select the specific remote site to receive the particular communication.

2. The system defined in claim 1, wherein the communication interface comprises a telephone switching system and wherein the communications comprise telephone transmissions.

3. The system defined in claim 2, further comprising a voice recognition device for interacting with the sender of a communication.

4. The system defined in claim 1, wherein the plurality of remote sites include computer terminals coupled together by a network system.

5. The system defined by claim 1, wherein the communications comprise orders.

6. The system defined by claim 5, wherein the remote sites comprise shops.

7. A system for routing communications to one of a plurality of remote terminals comprising:

a central processing unit;

a storage device operatively associated with the central processing unit to store routing data identifying a plurality of remote terminals and associated with the number of times that each of the remote terminals has sent a communication to other remote terminals for a prior period and further associated with the number of times that each of the remote terminals has received a communication from other remote terminals for the prior period;

a selector operable in conjunction with the central processing unit to select a specific remote terminal to receive a particular communication; and a communication interface operatively associated with the central processing unit for forwarding the particular communication to the specific remote terminal, said central processing unit including means for automatically updating, without requiring human intervention, a ratio for at least one of the remote terminals from (a) the number of times that a particular remote terminal has sent a communication to other remote terminals and (b) the number of times that the particular remote terminal has received a communication from other remote terminals, and said selector employing the ratios for the remote terminals to select the specific remote terminal to receive the particular communication.

8. The system of claim 7, wherein the storage device comprises Random Access Memory.

9. The system of claim 8, wherein the storage device further comprises a hard disk drive.

10. The system of claim 7, wherein the communication interface is operable to receive and forward telephone transmissions.

11. The system of claim 10, further comprising a voice recognition device for interacting with the sender of a communication.

12. The system defined in claim 10, wherein the plurality of remote terminals identified by the routing data comprise telephones.

13. The system defined in claim 10, wherein the plurality of remote terminals identified by the routing data comprise facsimile machines.

14. The system defined in claim 7, further comprising means operatively associated with the central processing unit for receiving a communication and for receiving input data from a sender of a communication.

15. The system defined in claim 7, wherein said central processing unit includes means for receiving input data; and wherein the selector selects the specific remote terminal to receive the particular communication by comparing the input data with the routing data to select a sub-group of the remote terminals from the plurality of the remote terminals, and by comparing the ratio for each of the remote terminals of the selected sub-group.

16. The system defined in claim 7, wherein said means for automatically updating updates said ratio before said selector selects another remote terminal to receive another communication.

17. The system defined in claim 7, wherein said means for automatically updating updates said ratio after said communication interface forwards the particular communication to the specific remote terminal and before said selector selects another remote terminal to receive another communication.

18. The system defined in claim 7, wherein said means for automatically updating determines a particular ratio from the number of times that a remote terminal has received a communication divided by the number of times that said remote terminal has sent a communication; and wherein said selector includes means for selecting the specific remote terminal which has the lowest of the ratios for the remote terminals.

19. A method for routing communications comprising the steps of:

storing routing data in a storage device operatively associated with a central processing unit, the routing data identifying a plurality of remote sites and associated with the number of times that each of the remote sites has sent a communication to other remote sites for a prior period, and further associated with the number of times that each of the remote sites has received a communication from other remote sites for the prior period;

receiving a communication at a central processor;

automatically updating, without requiring human intervention, a ratio for at least one of the remote sites from (a) the number of times that a particular remote site has sent a communication to other remote sites and (b) the number of times that the particular remote site has received a communication from other remote sites;

rewarding remote sites that frequently send a communication to other remote sites by employing the ratios for the remote sites to select a remote site to receive said communication received at the central processor; and forwarding said communication received at the central processor to the selected remote site.

20. The method of claim 19, further comprising the step of receiving input data identifying the locale to which the communication is to be forwarded.

21. The method of claim 20, wherein the step of rewarding remote sites that frequently send communications to other remote sites, comprises the steps of:

comparing the input data with the routing data to select a sub-group of remote sites from the plurality of remote sites; and selecting the particular remote site to receive the communication based on the routing data for each remote site of the selected sub-group of remote sites.

22. The method of claim 19, wherein the communication to be routed comprises a telephone transmission.

* * * * *

UNITED STATES PATENT AND TRADEMARK OFFICE
CERTIFICATE OF CORRECTION

PATENT NO. : 5,852,809
DATED : December 22, 1998
INVENTOR(S) : Abel et al.

It is certified that error appears in the above-identified patent and that said Letters Patent is hereby corrected as shown below:

Col. 8, line 55, "4ais" should read --14a is--, as originally submitted.

Col. 9 line 11, "4awho" should read --14a who--, as originally submitted.

Col. 9, line 15, "4areceive" should read --14a receive--, as originally submitted.

Col. 9, line 24, "4a)or" should read --14a) or--, as originally submitted.

Col. 11, line 64, "4aor" should read --14a or--, as originally submitted.

Col. 12, line 64, ""ending" should read --"sending--, as originally submitted.

Col. 12, line 67, "14bare" should read --14b are--, as originally submitted.

Col. 13, line 2, "4aor" should read --14a or--, as originally submitted.

UNITED STATES PATENT AND TRADEMARK OFFICE
CERTIFICATE OF CORRECTION

PATENT NO. : 5,852,809

DATED : December 22, 1998

INVENTOR(S) : Abel et al.

It is certified that error appears in the above-identified patent and that said Letters Patent is hereby corrected as shown below:

Col. 13, line 34, "4awho" should read --14a who--, as originally submitted.

Col. 19, line 12, "sites" should read --site--, as originally submitted.

Signed and Sealed this

Twenty-ninth Day of February, 2000

Attest:

Attesting Officer

Q. TODD DICKINSON

Commissioner of Patents and Trademarks